(12) United States Patent
Krishnaswamy et al.

(10) Patent No.: US 9,014,640 B2
(45) Date of Patent: Apr. 21, 2015

(54) WAKE-UP TRIGGER FOR IMPLEMENTATION OF TARGET ACTIONS

(75) Inventors: Dilip Krishnaswamy, San Diego, CA (US); Frederick D. Kim, Carlsbad, CA (US); Robert S. Daley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 12/262,585

(22) Filed: Oct. 31, 2008

(65) Prior Publication Data

US 2010/0112955 A1 May 6, 2010

(51) Int. Cl.
  H04B 17/00 (2006.01)
  H04L 29/08 (2006.01)
  G06F 1/32 (2006.01)
  H04M 1/725 (2006.01)
  H04W 88/02 (2009.01)

(52) U.S. Cl.
  CPC ............ *H04L 67/325* (2013.01); *G06F 1/3203* (2013.01); *G06F 1/329* (2013.01); *H04M 1/72566* (2013.01); *H04W 88/02* (2013.01); *Y02B 60/144* (2013.01)

(58) Field of Classification Search
  USPC ......................................... 709/201–202, 229
  See application file for complete search history.

(56) References Cited

U.S. PATENT DOCUMENTS

| | | | |
|---|---|---|---|
| 5,544,321 A | | 8/1996 | Theimer et al. |
| 5,859,970 A | * | 1/1999 | Pleso ............................ 709/250 |
| 6,418,535 B1 | | 7/2002 | Kulakowski et al. |
| 7,206,849 B1 | * | 4/2007 | Gernert et al. ................. 709/229 |
| 7,732,949 B2 | * | 6/2010 | Goodnow et al. .............. 307/151 |
| 7,737,896 B1 | * | 6/2010 | Suri et al. ....................... 343/702 |
| 7,890,301 B2 | * | 2/2011 | Warrior et al. ................. 702/188 |
| 8,175,659 B2 | * | 5/2012 | Toyoda et al. .................. 455/572 |
| 8,677,168 B2 | * | 3/2014 | Pocklington et al. ......... 713/340 |
| 2003/0140088 A1 | | 7/2003 | Robinson et al. |
| 2003/0220118 A1 | * | 11/2003 | Chhabra ........................ 455/459 |
| 2004/0210628 A1 | * | 10/2004 | Inkinen et al. ................. 709/201 |

(Continued)

FOREIGN PATENT DOCUMENTS

| | | |
|---|---|---|
| CN | 101078988 A | 11/2007 |
| EP | 1445703 A1 | 8/2004 |

(Continued)

OTHER PUBLICATIONS

Anderson D P et al: "SETI home: an experiment in public-resource computing" Communications of the Association for Computing Machinery, ACM, New York, NY, US, vol. 45, No. 11, Nov. 1, 2002, pp. 56-61, XP002436446 ISSN: 0001-0782 p. 58, left-hand column.

(Continued)

*Primary Examiner* — Zhiyu Lu
(74) *Attorney, Agent, or Firm* — Fariba Yadegar-Bandari

(57) ABSTRACT

Aspects relate to automatic execution of a target action, which can be energy-intensive tasks, processing compute-intensive tasks, interaction with a node, or combinations thereof. A context aware trigger, power aware trigger, a randomly scheduled wakeup trigger, a deterministically scheduled wakeup trigger, and/or a predictively scheduled wakeup trigger can be utilized to determine the availability of contexts associated with the target action. Based on the availability of a context that should be available, one or more target actions are automatically executed and/or selectively suspended.

24 Claims, 10 Drawing Sheets

(56) References Cited

U.S. PATENT DOCUMENTS

| | | | |
|---|---|---|---|
| 2005/0129009 A1* | 6/2005 | Kitchin | 370/389 |
| 2006/0025105 A1* | 2/2006 | Sato | 455/343.1 |
| 2006/0135145 A1* | 6/2006 | Redi | 455/420 |
| 2006/0198299 A1* | 9/2006 | Brzezinski et al. | 370/229 |
| 2007/0171910 A1* | 7/2007 | Kumar | 370/392 |
| 2007/0238440 A1* | 10/2007 | Sengupta et al. | 455/343.2 |
| 2008/0102815 A1* | 5/2008 | Sengupta et al. | 455/424 |
| 2009/0058361 A1* | 3/2009 | John | 320/128 |

FOREIGN PATENT DOCUMENTS

| | | | |
|---|---|---|---|
| EP | 1465075 A2 | 10/2004 | |
| JP | 2007318334 A | 12/2007 | |
| WO | WO2008091472 A1 | 7/2008 | |

OTHER PUBLICATIONS

International Search Report & Written Opinion—PCT/US2008/088330, International Search Authority—European Patent Office—Sep. 4, 2009.

Taiwan Search Report—TW097151715—TIPO—May 27, 2012.

Taiwan Search Report—TW101145342—TIPO—Aug. 14, 2014.

\* cited by examiner

US 9,014,640 B2

WAKE-UP TRIGGER FOR IMPLEMENTATION OF TARGET ACTIONS

BACKGROUND

I. Field

The following description relates generally to wireless communications and more particularly to scheduling of tasks and/or information exchange to improve communications and to conserve resources.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video and so forth can be provided through wireless communication systems. A typical wireless communication system, or network, can provide multiple users access to one or more shared resources. A system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

In order to improve device performance and a user's experience, modeling a user's behavior can be conducted through data mining or other user authorized techniques. For example, data mining can be performed to mine information associated with the user device (e.g. applications utilized) in order to better understand the user. Thus, at times, there can be algorithms and/or applications executing as background processing and the user might not be aware that these algorithms/applications are executing their respective functions. In order to execute these algorithms/applications, system resources (e.g., battery power, bandwidth) need to be consumed. However, if the user is utilizing the device (e.g., consuming bandwidth and system resources), there is no (or limited) connectivity, and/or one or more resources are not available, the task associated with the algorithm/application does not execute (e.g. drops off, disappears) and no further action is performed until a next execution is to be conducted. Thus, any information (e.g. mined data) that was available is lost since the task could not be executed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with an automatic execution of a target action. An aspect relates to a method for automatically triggering execution of a target action. The method includes determining a desired context as a function of a target action. The desired context is an energy level, a processing performance level, a connectivity of a wireless link, a performance measure on a wireless link, an availability of an associated device, or combinations thereof. The method also includes evaluating availability of the desired context and executing the target action automatically if the desired context is available.

Another aspect relates to a wireless communications apparatus that comprises a memory and a processor. The memory retains instructions related to determining a desired context as a function of a target action, evaluating availability of the desired context, and executing the target action automatically if the desired context is available. The desired context is an energy level, a processing performance level, a connectivity of a wireless link, a performance measure on a wireless link, an availability of an associated device, or combinations thereof. The processor is coupled to the memory and is configured to execute the instructions retained in the memory.

A further aspect relates to a wireless communications apparatus that automatically triggers execution of a target action. The apparatus includes means for determining a desired context as a function of a target action. The desired context is an energy level, a processing performance level, a connectivity of a wireless link, a performance measure on a wireless link, an availability of an associated device, or combinations thereof. Apparatus also includes means for evaluating availability of the desired context and means for executing the target action automatically if the desired context is available.

Yet another aspect relates to a computer program product that comprises a computer-readable medium. The computer-readable medium comprises a first set of codes for causing a computer to determine a desired context as a function of a target action. The desired context is an energy level, a processing performance level, a connectivity of a wireless link, a performance measure on a wireless link, an availability of an associated device, or combinations thereof. The computer-readable medium also includes a second set of codes for causing the computer to evaluate availability of the desired context and a third set of codes for causing the computer to execute the target action automatically if the desired context is available. Further, the computer-readable medium includes a fourth set of codes for causing the computer to retain data associated with the target action if the context is not available.

A further aspect relates to at least one processor configured to trigger execution of tasks automatically. The processor includes a first module for determining a desired context as a function of a target action. The desired context is an energy level, a processing performance level, a connectivity of a wireless link, a performance measure on a wireless link, an availability of an associated device, or combinations thereof. The processor also includes a second module for evaluating availability of the desired context and a third module for executing the target action automatically if the desired context is available. Also included is a fourth module for monitoring the availability of the desired context. Processor further includes a fifth module for suspending execution of the target action if the desired context is no longer available and a sixth module for retaining data associated with the suspended target action.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
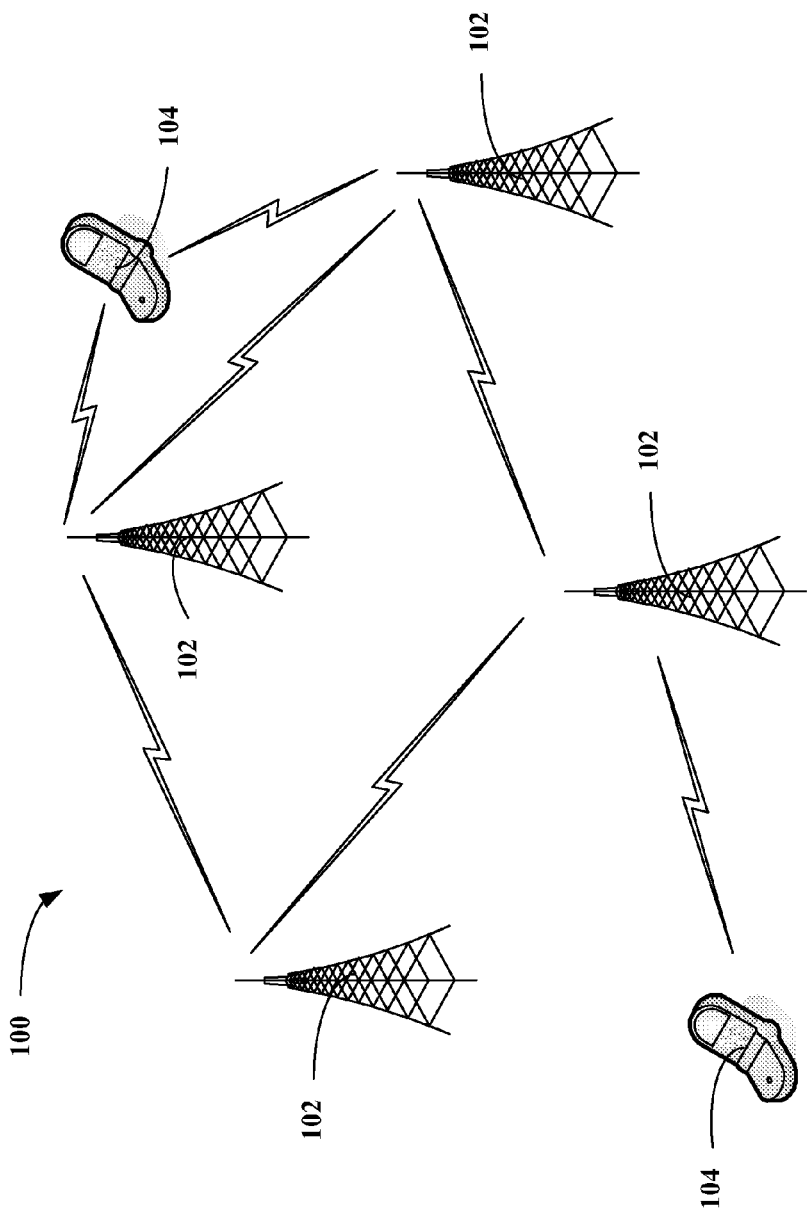
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, a wireless communication system 100 in accordance with various aspects presented herein is illustrated. System 100 can comprise one or more base stations 102 in one or more sectors that receive, transmit, repeat, and so forth, wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

One or more base stations 102 can be associated with a remote server that gathers information mined on one or more mobile devices 104. In order for the information to be transmitted to the remote server, mobile device 104 can be configured to automatically execute a task and/or convey information (sometimes referred to herein as target action) when one or more contexts associated with the device 104 are satisfied (e.g., certain conditions are met). Contexts include, but are not limited to, an energy level, a processing performance level, a connectivity of a wireless link, a performance measure on a wireless link, an availability of an associated node (e.g., base station, remote server, mobile device, peer node, and so forth), or combinations thereof. In another example, information can be transmitted between two peer devices automatically according to the aspects disclosed herein. If the context(s) are not satisfied, data associated with the target action is retained (e.g. in a cache, storage medium, memory, computer-readable medium, and so forth) until the context(s) are satisfied. In such a manner, the data associated with the target action is not lost, which is an advantage over conventional systems that discard the data if the target action cannot be performed. Further, if one or more contexts change during implementation of a target action in accordance with the disclosed aspects, the target action can be automatically suspended until the contexts are once again satisfied. The data associated with the suspended actions is retained for execution of the task/information exchange at a later time (e.g., when the contexts are satisfied).

For example, a mobile device 104 can be configured to selectively convey the information and/or execute a task during times when the mobile device has a high level of battery power and/or is connected to a power source. Further, mobile device 104 might be configured to convey the information and/or execute tasks only when there is a communication link that has signal strength higher than a configurable threshold level, for example. It should be understood that these tasks are not time sensitive tasks (e.g. do no have to be performed in real-time) and, therefore, can be delayed as needed until the desired context is available.

Figure 2:
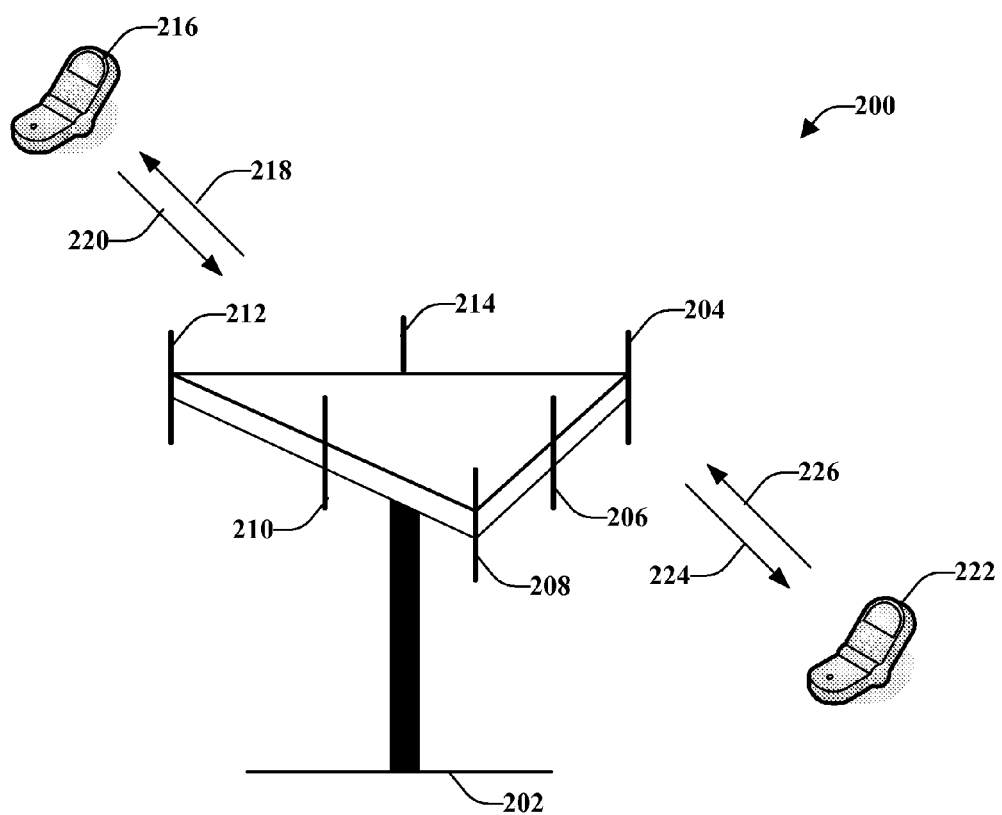
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 is illustrated that includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 218 and receive information from mobile device 216 over reverse link 220. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 224 and receive information from mobile device 222 over reverse link 226. In a FDD system, for example, communication links 218, 220, 224, and 226 might utilize different frequencies for communication. For example, forward link 218 might use a different frequency than the frequency utilized by reverse link 220.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

In communication over forward links 218 and 224, the transmitting antennas of base station 202 can utilize beamforming in order to improve a signal-to-noise ratio of forward links for the different mobile devices 216 and 222. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

In accordance with some aspects, system 200 is configured to evaluate a battery-energy level on a device platform to determine if the energy level has degraded such that it might become cost prohibitive from an energy perspective to execute certain tasks on the platform without the availability of a power supply. Such tasks can include energy-intensive tasks such as obtaining Global Positioning System (GPS) fixes, processing compute-intensive data mining tasks in the background, interaction with a server for distributed processing over the Internet, and other tasks. The energy costs for such tasks could be significant from a radio energy utilization perspective, a platform processing perspective, or combinations thereof. A power-aware trigger, a context-aware trigger, random scheduler, deterministic scheduler, and/or predictive scheduler can initiate a wakeup trigger that can be utilized to determine the availability of a connected power supply (and/or another context), which can then be utilized to execute such tasks.

Figure 3:
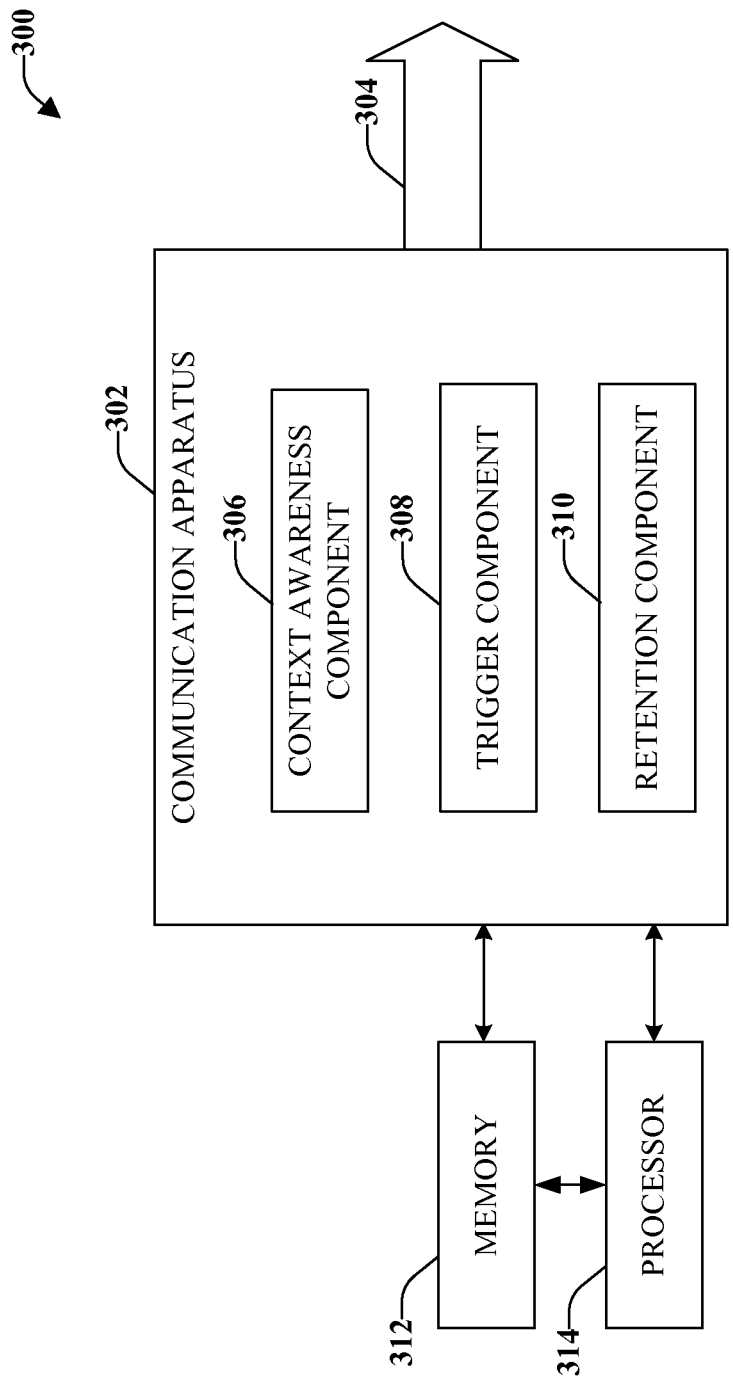
FIG. 3 illustrates a system that is configured to selectively delay activation of tasks and/or information exchange with one or more nodes in accordance with one or more aspects.

FIG. 3 illustrates a system 300 that is configured to selectively delay activation of tasks and/or information exchange with one or more nodes in accordance with one or more aspects. The activation can be based in part on conformance with one or more contexts that should be available for performance of the task(s) and/or the information exchange.

System 300 includes a communication apparatus 302 that is shown to be transmitting data through a channel 304. Although depicted as transmitting data, communication apparatus 302 can also receive data through the channel 304 (e.g., communication apparatus 302 can concurrently transmit and receive data, communication apparatus 302 can transmit and receive data at different times, or combinations thereof). Communication apparatus 302, for example, can be a mobile device (e.g., mobile device 104 of FIG. 1, mobile device 216 or 222 of FIG. 2), or the like.

Communications apparatus 302 includes a context awareness component 306 that is configured to monitor and evaluate a context associated with communications apparatus 302. The context can include an energy level, a processing performance level, connection to a power supply, availability of a wireless link, status of the wireless link, a performance measure on a wireless link, availability of a remote server, availability of a peer device, and so forth. Context awareness component 306 can implement a schedule for certain tasks by reviewing the cost of the tasks (e.g., energy consumption, bandwidth availability) and schedule more expensive tasks at a later time, if needed. For example, it is possible that if an energy level is high enough, a target action might be executed. However, if the energy level in the battery is low, context awareness component 306 might wait for a power supply to become available and then execute the delayed target action.

In accordance with some aspects, context awareness component 306 can utilize a randomly scheduled event to evaluate the availability of a context. According to another aspect, context awareness component 306 can utilize a deterministic schedule to evaluate the availability of a context. In accordance with another aspect, predictive techniques can be utilized by context awareness component 306. Further information related to these aspects will be provided below.

Based on whether the context is available for a target action (e.g a task, information exchange, and so forth), a trigger component 308 and/or retention component 310 can perform respective functions. Trigger component 308 is configured to automatically initiate the target action if the context is available. For example, context awareness component 306 can detect the availability of the desired context and notify trigger component 308 that conditions for execution of the target action are available. Based on this information, trigger component 308 can automatically execute the target action.

If the desired context is not available, context awareness component 306 can notify retention component 310 that the target action needs to be delayed. Retention component 310 is configured to retain information associated with the target action for use when there is a later attempt to initiate the target action. When conditions are acceptable for the target action (e.g. the desired context is available), based on information received from context awareness component 306, trigger component 308 can gather the information retained by retention component 310. In accordance with some aspects, retention component 310 automatically sends the information to trigger component 310 upon notification that the desired context is available.

Thus, target actions that are delayed can be placed in a delayed queue or a dormant query while waiting to be scheduled when a context, such as an energy level is above a certain threshold or the device is connected to a power supply, for example. In such a manner, if the task and/or information exchange cannot be conducted based on current conditions, the information is not lost and the task and/or information exchange is implemented when the context is available (e.g., conditions are better for carrying out the target action).

In accordance with some aspects, the context might change during execution of a target action. For example, while the target action is being executed in a background application, the user might execute an application (e.g., user initiated action) that consumes a large amount of computing power, battery power, and so forth. Thus, context awareness component 306 can periodically or continually monitor the context and, if the context changes, can notify trigger component 308 to suspend execution of the task/information exchange. In such a manner, the background application (e.g., the execution of the target action) enters a dormant mode so that processing capabilities of communication apparatus 302 are not overwhelmed (e.g. user can perform the user-initiated action). Data associated with the suspended task/information exchange can be retained by retention component 310.

Further, context awareness component 306 can take into consideration the actions the user is performing with apparatus 302. For example, if the user launches a browser and wants to play a video, a target action that was executing might need to enter a dormant mode so that a platform of apparatus 302 is not overwhelmed. In this situation, selectively suspending the target action can improve the user experience since the processing capabilities of the user device are not overburdened.

System 300 can include memory 312 operatively coupled to communication apparatus 302. Memory 312 can be external to communication apparatus 302 or can reside within communication apparatus 302. Memory 312 can store information related to determining a desired context as a function of a target action, evaluating availability of the desired context, and executing the target action automatically if the desired context is available, and suitable information related to signals transmitted and received in a communication network. A processor 314 can be operatively connected to communication apparatus 302 (and/or memory 312) to facilitate analysis of information related to a wake-up trigger for implementation of tasks, information exchange, a distributed processing task over a wireless communication link, and/or another target action in a communication network. Processor 314 can be a processor dedicated to analyzing and/or generating information received by communication apparatus 302, a processor that controls one or more components of system 300, and/or a processor that both analyzes and generates information received by communication apparatus 302 and controls one or more components of system 300.

Memory 312 can store protocols associated with automatic initiation and/or suspension of one more system implemented target actions, taking action to control communication between communication apparatus 302 and other devices (e.g. peer devices, remote servers, and so forth), such that system 300 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 4:
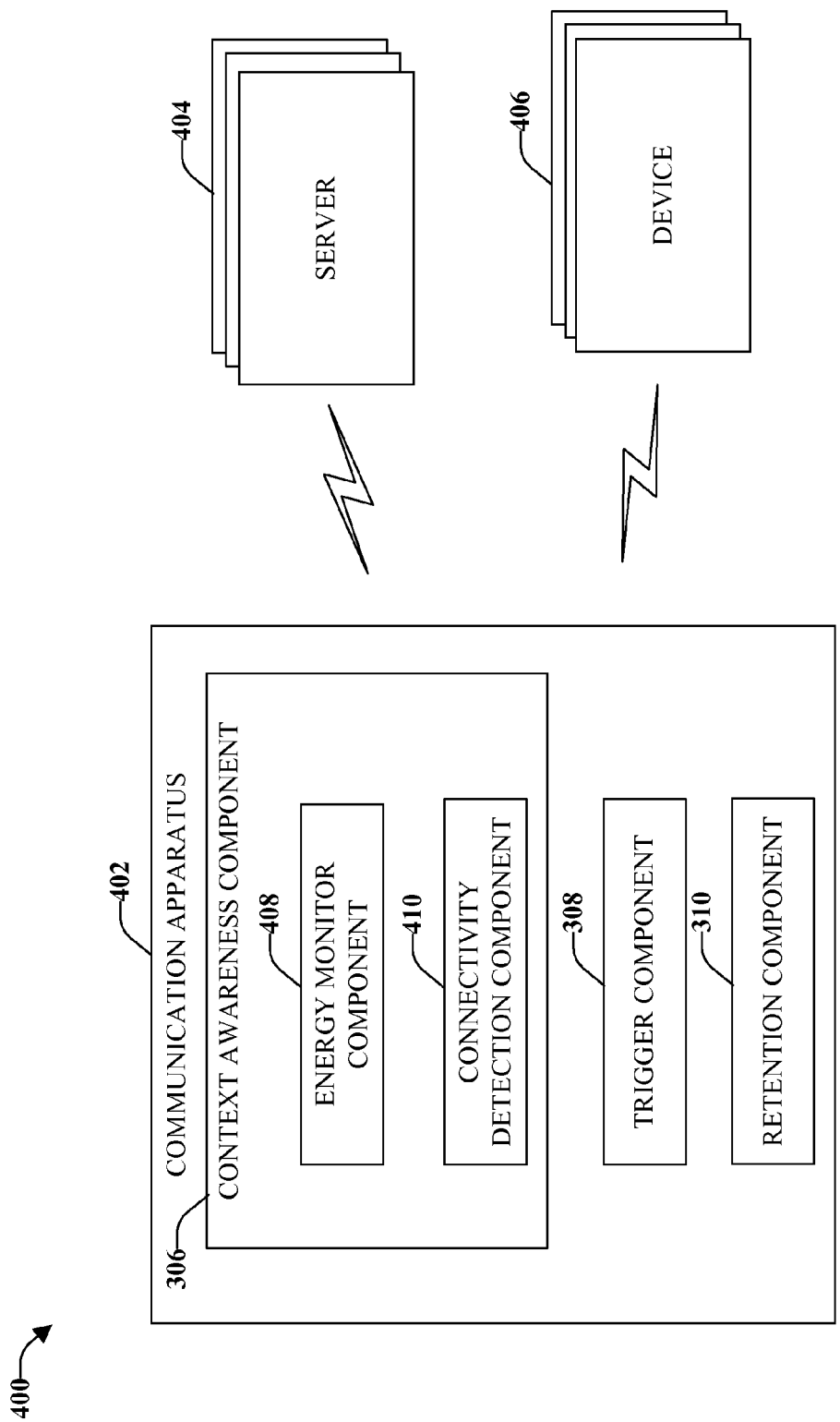
FIG. 4 illustrates a system for automatically executing a target action when system parameters are adequate for execution of those actions in accordance with an aspect.

FIG. 4 illustrates a system 400 for automatically executing a target action when system parameters are adequate for execution of those actions in accordance with an aspect. System 400 provides a trigger that is power aware, context aware and/or a wake up trigger that is scheduled (e.g., randomly, deterministically, predictively) to determine if context requirements (e.g., the availability of a connected power supply, close proximity of nodes (e.g., server, peer devices, and so forth)) are fulfilled. If a context changes after a target action is started, the action can be suspended for deployment later, when the desired context is available.

Included in system 400 is a communication apparatus 402 that is configured to execute tasks, facilitate communication, and/or to perform other computing functions. Communications apparatus 402 is configured to communicate with one or more remote servers 404 and/or one or more remote devices 406. Communication apparatus 402 includes a context awareness component 306 that is configured to monitor (periodically, continuously, and so forth) contexts associated with communication apparatus 402, such as a processing performance level.

A processing performance level can include a processing performance constraint, which can be less than or equal to an available performance measure. The available performance measure can be selectively modified based on one or more performance requirements for associated tasks (e.g., can be varied based on performance requirements for other tasks executing on the platform). In accordance with some aspects, the processing performance measure on the wireless link includes a wireless link delay constraint, a wireless link bandwidth constraint, a wireless link power constraint, a wireless link interference constraint, an average wireless link throughput constraint, or combinations thereof. According to some aspects, the performance measure on the wireless link is an end-to-end quality of service measure. The end-to-end quality of service measure comprises an end-to-end delay constraint, an end-to-end throughput constraint, or combinations thereof.

Associated with context awareness component 306 is an energy monitor component 408 that is configured to detect the existence of a power source. For example, a user may connect communication apparatus 402 to an outlet or other power supply in order to recharge the battery of communication apparatus 402. At substantially the same time as the communication apparatus 402 is connected to the power supply, the energy monitor component 408 can detect the connection. Based upon this detection, energy monitor component 408 can interact with trigger component 308, which automatically deploys one or more target actions (tasks, conveyance of information, or combinations thereof). System 400 can perform the target actions automatically through background processing, without requiring user interaction.

In accordance with some aspects, context awareness component 306 (or energy monitor component 408) can utilize a randomly scheduled event to evaluate the availability of a context, such as a connected power supply. If communications apparatus 402 is in a low energy state, the expiration of a real time clock (RTC) domain timer can be utilized to wake up a platform associated with communications apparatus 402 to check for the availability of a connected power supply. For example, the availability of the connected power supply can be determined by checking the value in a register of a power management integrated circuit (IC) or in a register on a system-on-chip for the platform. If connected to a power supply, trigger component 308 can initiate the target action. If the communications apparatus 402 does not have a connected power supply, a subsequent event can be scheduled at another random time (e.g., using an RTC timer) to check for the availability of the power supply. A retention component 310 can be configured to retain data related to the target action. It should be noted that the data retained by retention component 310 should be data that is not time sensitive.

In accordance with some aspects, context awareness component 306 (or energy monitor component 408) can utilize a deterministic schedule to trigger an optional wakeup through a trigger component 308 and check for the availability of the power supply.

According to some aspects, predictive techniques can be utilized by context awareness component 306 (and/or energy monitor component 408). Predictive techniques can be based on past behavior related to when the power supply was previously connected. This past behavior can be utilized to estimate a future time when communications apparatus 402 might be connected to a power supply again. If the power supply is not connected at that future time, context awareness component 306 (and/or energy monitor component 408) could check more frequently with timer event triggers in a time window around the future time.

In accordance with some aspects, a predictive technique can include a predictive schedule that includes a variable delay between two consecutive wakeup events. The delay between two consecutive wakeup events can be increased to conserve power. Additionally or alternatively, the delay between two consecutive wakeup events can be varied based on a likelihood of the occurrence of the desired context.

Based on the randomly/deterministically/predictively scheduled triggers, the tasks of interest can be executed by trigger component 308, if desired, when it is determined that a power supply is connected (or when there is compliance with a context necessary for the action). Additionally or alternatively, the target action could be scheduled when the power supply is connected and the platform of communication apparatus 402 automatically detects the availability of the power supply such that the platform is automatically configured to execute the target action upon detection of the availability of the power supply. Further, a trigger could be generated on the platform based on the context or environment that the communications apparatus 402 is in to check for the availability of the power supply.

Additionally or alternatively, distributed tasks that require communication could be processed in accordance with the disclosed aspects. Such distributed tasks include interaction with a server 404 on the Internet, interaction with connected peer devices 406, and so forth. For example, a target action might require wireless connectivity with a remote server, wherein the wireless connectivity consumes wireless bandwidth. Thus, considerations can include whether there is enough energy on the platform and/or whether there is sufficient wireless link conditions so that the target action can be implemented with the remote server 404.

For example, there is a data mining task (target action) that requires connectivity to a server 404 over a WWAN backhaul and, while communication apparatus 402 is in the user's home, the wireless signal strength is low. Thus, the target action might not be executed while apparatus is in the user's house. However, when the user is driving to work (e.g., in a car) the signal strength is high and the target action can be automatically implemented while the user is driving to work, provided the energy level is appropriate.

If the target action cannot be carried out (e.g., communications apparatus 402 is not connected to a power supply), information associated with the task can be retained in a retention component 310 and such information can be utilized at a time when the target action can be performed.

Also included in wireless communications apparatus 402 can be a connectivity detection component 410 that is configured to detect availability of a communication link and/or parameters associated with the communication link (e.g., a level of connectivity, a signal strength, a performance measure on a wireless link, and so forth). Based in part on the communication link and/or parameters associated with the communication link, target actions can be conducted at times when the communication link and/or associated parameters are sufficient for the target action to be conducted.

Based on detection of the existence of the power supply, a communication link, communication parameters, or combinations thereof, one or more target actions can be initiated by a trigger component 308. The desired context can be monitored by context awareness component 306 and/or associated components. If the context changes, the target action can be suspended and the applications associated therewith can enter a dormant state until such time as the context is once again favorable for the target action. The suspended applications and/or data associated with the suspended applications can be stored by retention component 310.

Communications apparatus 402 can include a memory and a processor. The memory can retain instructions related to carrying out one or more functions associated with the disclosed aspects. The processor, which is operatively connected to memory, can be configured to carry out the instructions retained in memory.

Figure 5:
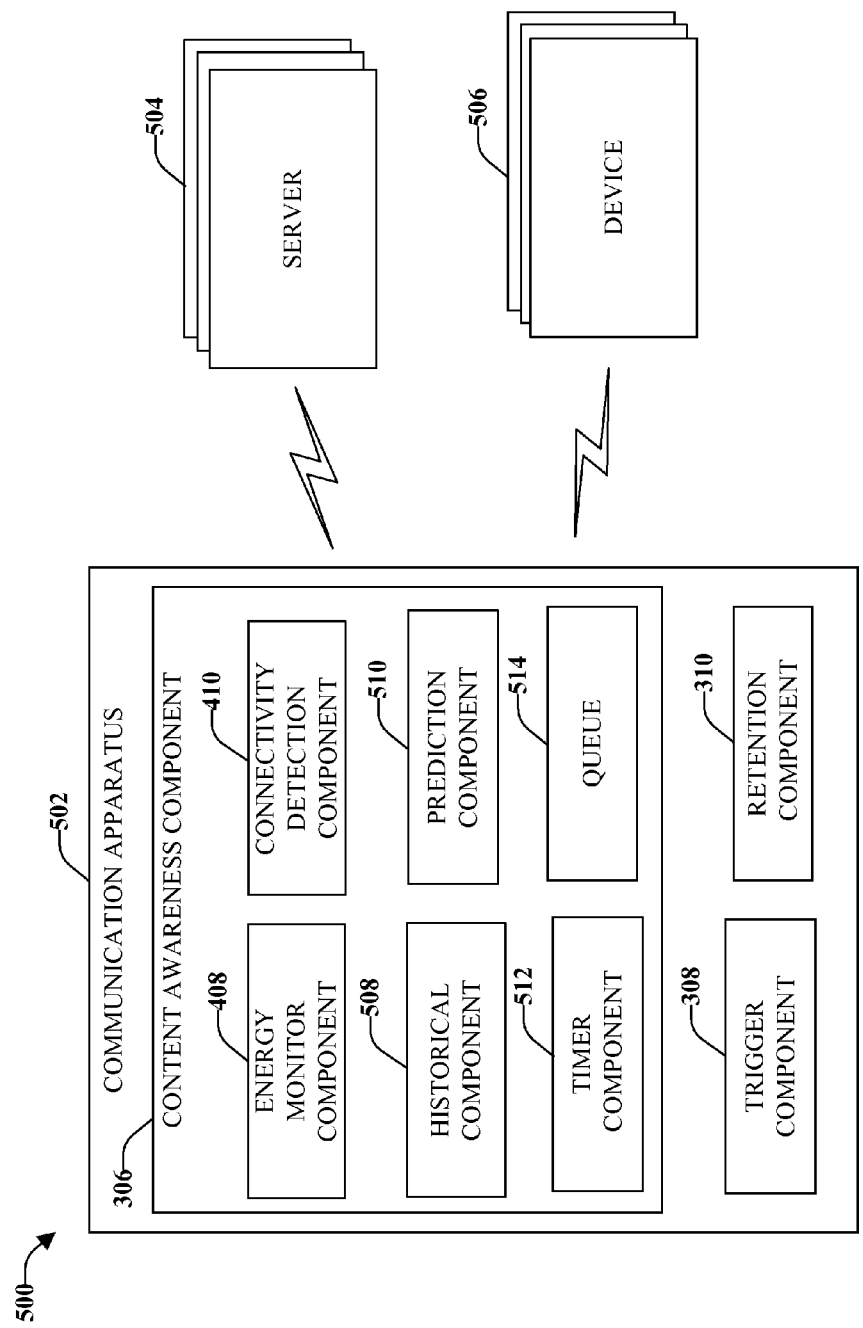
FIG. 5 illustrates a system that deploys a target action based on various criteria in accordance with the aspects disclosed herein.

FIG. 5 illustrates a system 500 that deploys a target action based on various criteria in accordance with the aspects disclosed herein. System 500 includes a communications apparatus 502 that is configured to communicate with one or more remote servers 504 and/or one or more remote devices 506. For example, a server 504 can be a server that gathers information associated with the user of communication apparatus 502 and/or functions associated with communication apparatus 502. A device 506 can be a peer device or another device with which data transfer should occur.

Communication apparatus 502 includes a context awareness component 306 that is configured to monitor and evaluate a context associated with communications apparatus 302 and determine whether the context is acceptable for a target action. The context can include an energy level, a processing performance level, connection to a power supply, availability of a wireless link, status of the wireless link, a performance measure on a wireless link, availability of a remote server, availability of a peer device, and so forth.

Associated with the context awareness component 306 is an energy monitor component 408 that is configured to monitor energy statuses of communications apparatus 502. For example, energy monitor component 408 can detect that communications apparatus 502 has a low energy status, which can indicate that there is a low battery level. In accordance with some aspects, energy monitor component 408 can detect that applications executing on communications apparatus 502 are consuming a larger than usual amount of power. In such situations, it can be determined that in order to execute a target action (e.g. a task, such as a distributed processing task over a wireless communication link, and/or convey information) automatically, communications apparatus 502 should be connected to a power source.

Also included in communications apparatus 502 is a connectivity detection component 410 that evaluates a level of connectivity and/or whether there is a communication link with server(s) 504 and/or device(s) 506. In accordance with some aspects, prior to a target action being initiated, connectivity between communications apparatus 502 and the related entity (e.g., server 504, device 506), such as a communication link should be established and/or associated parameters (e.g., signal strength, wireless link performance measure, and so on) should be met prior to initiation of the target action. For example, the associated device (or node) can be a remote server and the desired context is an availability of connectivity with the remote server.

A trigger component 308 is configured to initiate the target action based on the energy status, the level of connectivity, other contexts, or combinations thereof. In accordance with some aspects, trigger component 308 might determine that a target action should be initiated when the energy status indicates that the communications apparatus 502 has a full battery charge or when the communications apparatus 502 is connected to a power source. According to some aspects, trigger component 308 might determine that a task or information exchange should be initiated at times when there is a high level of connectivity. In accordance with a further aspect, trigger component 308 determines that a high energy status (e.g., connected to a power supply) and a high level of connectivity should both be available before a task and/or information exchange is initiated. However, other criteria can be utilized by trigger component 308 to make a determination in accordance with the disclosed aspects. For example, it might be determined that a user-initiated application is consuming processing capabilities above a threshold level and therefore, the target action is not started and/or is suspended if already in process.

Also included in wireless communications apparatus 502 is a retention component 310 that is configured to capture and store data related to the task and/or information conveyance that was suspended or not started (instead of discarding the data). The data retained by retention component 310 can be utilized at a later time when implementing the associated actions.

Additionally or alternatively, communications apparatus 502 includes a historical component 508 that retains information related to events, behaviors, or combinations thereof, associated with the contexts (e.g., connectivity, the existence of a power supply, and so forth). Information retained by historical component 508 can include previous times when communications apparatus 502 was connected to a power supply, for example. Based on the past behavior related to when the power supply was previously connected, a prediction component 510 can be configured to estimate a future time when the communication apparatus 502 might be reconnected to a power supply. If energy monitor component 408 does not detect connection of the power supply at the estimated future time, a timer component 512 can establish a time window or configurable interval associated with an estimated future time, wherein energy monitor component 408 can check status of the power supply (e.g., connected, not connected) at different intervals within that time window. For example, if it is estimated that communications apparatus 502 should be connected to a power supply at 3 p.m., the time window can be from 2:45 p.m. to 3:15 p.m. The energy monitor component 408 can check for connection to the power supply at different intervals during this time window. For example, the energy monitor component 408 can check every few minutes during this time window or more frequently, such as every minute, half minute, and so forth.

In accordance with some aspects, a queue 514 is configured to determine which target action, if any, should be conducted at a particular time. For example, there can be some target actions that might need to have both power awareness and awareness of another context (e.g., connectivity, processing performance constraint, end-to-end quality of service measure, and so on), to decide if a target action should be performed. One or more actions that should be performed can be included in the queue 514, however, the context necessary for executing each action can be different. Thus, queue 514 can be configured to review the context needed for each action to determine if something can be executed based on the current context, which can be provided by context awareness component 306. Thus, if a first action cannot be executed, queue can review a next action and so forth until finding an action that can be executed, if any action can be executed based on the current context. The actions can be listed in the queue 514 in any order, such as order of importance, the last time the action was performed (e.g., the action not performed in the longest amount of time is listed first), and so forth.

Based in part on these random, deterministic, and/or predictive scheduled triggers, the tasks of interests (e.g., data reporting, data gathering, communication tasks, distributed processing tasks, and so forth) can be executed by trigger component 308 when it is determined that the power supply is connected and/or other contexts are available. According to some aspects, the tasks of interest can be scheduled when the power supply is connected and the platform itself automatically detects the availability of the power supply. For example, the platform can be automatically configured to execute the tasks upon detection of the availability of the power supply. A trigger could also be generated on the platform based on a context or environment in which the communications apparatus 502 is in to ascertain availability of the power supply. Further, in addition to tasks executing on communications apparatus 502, distributed tasks that require communication can be processed. Such distributed tasks can include interaction with a server 504 on the internet and/or interaction with connected peer mobile devices 506.

By way of example and not limitation, there can be a target action that a user desires to execute with a friend (through interaction with a peer device). The next time the user of apparatus 502 is in the vicinity of their friend's device, a certain action is waiting to execute (e.g., to share some information). Thus, apparatus 502 is waiting for a certain context in order for the target action to automatically execute. For example, each user can have their respective device in their pocket, bag, and so forth. Since the target action (e.g., exchange of certain information) is waiting to execute, when the respective devices detect the presence of the other device, the action will automatically trigger. For example, the devices can share information over Bluetooth®, Wi-Fi, find each other through a WWAN backhaul, Peer-to-Peer connectivity over the Internet, and so forth. In accordance with some aspects, GPS can be utilized in order for the devices to discover each other. In another aspect, the devices can discover each other over the Internet, then discover Bluetooth® and exchange over Bluetooth® rather than the backhaul.

Communications apparatus 502 can include a memory and a processor. The processor can be operatively connected to memory and configured to carry out the instructions retained in memory. The memory can retain instructions related to carrying out one or more functions associated with the disclosed aspects.

Figure 6:
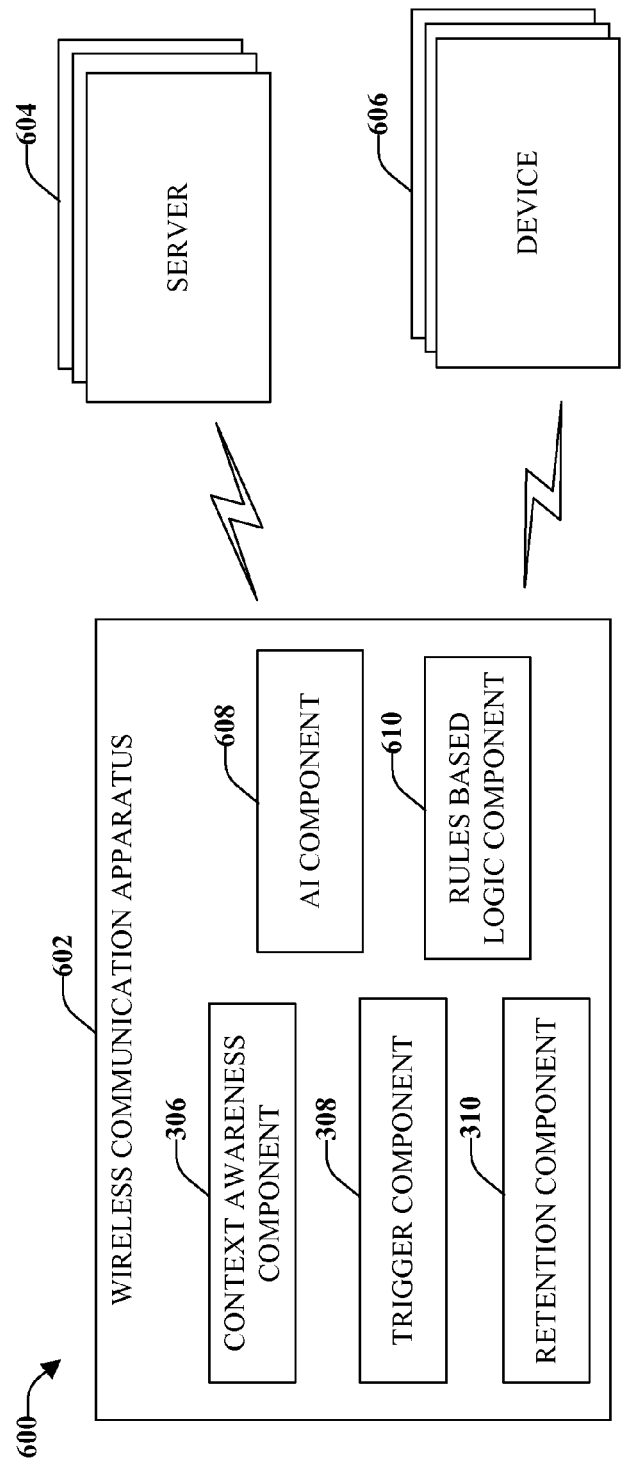
FIG. 6 illustrates a system that employs machine learning to automate one or more features associated with enabling a wakeup trigger to automatically initiate and/or automatically suspend the execution of target actions in accordance with the aspects described herein.

With reference now to FIG. 6, illustrated is a system 600 that employs machine learning to automate one or more features associated with enabling a wakeup trigger to automatically initiate and/or automatically suspend the execution of target actions in accordance with the aspects described herein. System 600 includes a communications apparatus 602 that selectively executes a target action with one or more servers 604, one or more devices 606, or combinations thereof. In accordance with some aspects, system 600 is configured to suspend a target action if a context associated with communication apparatus 602 changes during automatic execution of the target action.

A context awareness component 306 associated with communications apparatus 602 is configured to evaluate various contexts. For example, context awareness component 306 can evaluate an energy state and determine a time when certain tasks should be executed and/or certain types of data should be exchanged (or suspended) based on a battery power charge of communication apparatus 602 and a power consumption level needed for the task, the information exchange, and user initiated actions, and so on. Content awareness component 306 can evaluate a processing performance level and/or a performance measure on a wireless link. Further, context awareness component 306 can be configured to evaluate parameters of a communication link associated with communications apparatus 602 and one or more servers 604 and/or peer devices 606. Based on the parameters of the communication link, context awareness component 306 can recommend when a task should be executed, when data should be exchanged and/or when another target action should be performed.

Also included in communications apparatus 602 is a trigger component 308 that is configured to initiate the target action based in part on the recommendation of context awareness component 306. If it is determined that a target action should not be conducted and/or should be suspended, data associated with the target action can be captured and maintained by retention component 310. When the task/information exchange is performed at a later time, the data can be obtained from retention component 310, mitigating the loss of data if a particular target action cannot be performed for a variety of reasons (e.g., low power level of apparatus 602, processing intensive user-initiated actions, and so forth).

In accordance with some aspects, in order to determine when target actions should performed and/or suspended, an artificial intelligence (AI) component 608 and/or a rule-based logic component 610 can infer information relating to the target action.

The rules-based logic component 610 can be employed to automate certain functions described or suggested herein. In accordance with this aspect, an implementation scheme (e.g., rule) can be applied to define types of attributes that should be acted upon or ignored. Additionally or alternatively, an implementation scheme can create rules that are aware of one or more contexts necessary to perform the task and/or information exchange (e.g., connection to a power supply, connectivity performance, availability of a remote server and/or peer device, an end-to-end quality of service measure, a processing performance constraint, and so on) in order to recommend whether or not a particular action should be performed (e.g. initiate the task and/or information exchange, retain the data in cache until later, and so forth). By way of example, it will be appreciated that the rule-based implementation can automatically define criteria for when to initiate an action (e.g. execute a task, begin data exchange) and/or which target action to perform based on the result of the criteria (e.g., wait for connection to a power source, wait for adequate connectivity, suspend a current non-user initiated task/information exchange).

The AI component 608 can facilitate automating performance of one or more features described herein. For example, AI component 608 can learn what is normal and abnormal behavior characteristics of the apparatus 602 (e.g., when/ where the device has a high level of connectivity), learning specific interactions the user performs with the various applications (e.g., times when the user does not use communication apparatus 602, times when the apparatus is charging or connected to a power source), which can impact the behavior characteristics. Thus, employing various AI-based schemes can assist in carrying out various aspects thereof.

A classifier is a function that maps an input attribute vector, $x=(x1, x2, x3, x4, xn)$, to a class label class(x). A classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the disclosed aspects can employ classifiers that are pre-trained (e.g., through a generic training data from multiple users) as well as methods of reinforcement learning (e.g. by observing user behavior, observing trends, receiving extrinsic and/or intrinsic information). Thus, the disclosed aspects can be utilized to automatically learn and perform a number of functions, including but not limited to determining, according to a predetermined criteria.

Further, communications apparatus 602 can include a memory and a processor. The memory can retain instructions related to carrying out one or more functions associated with the disclosed aspects and/or suspending a target action. The processor can be operatively connected to memory and configured to carry out the instructions retained in memory.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
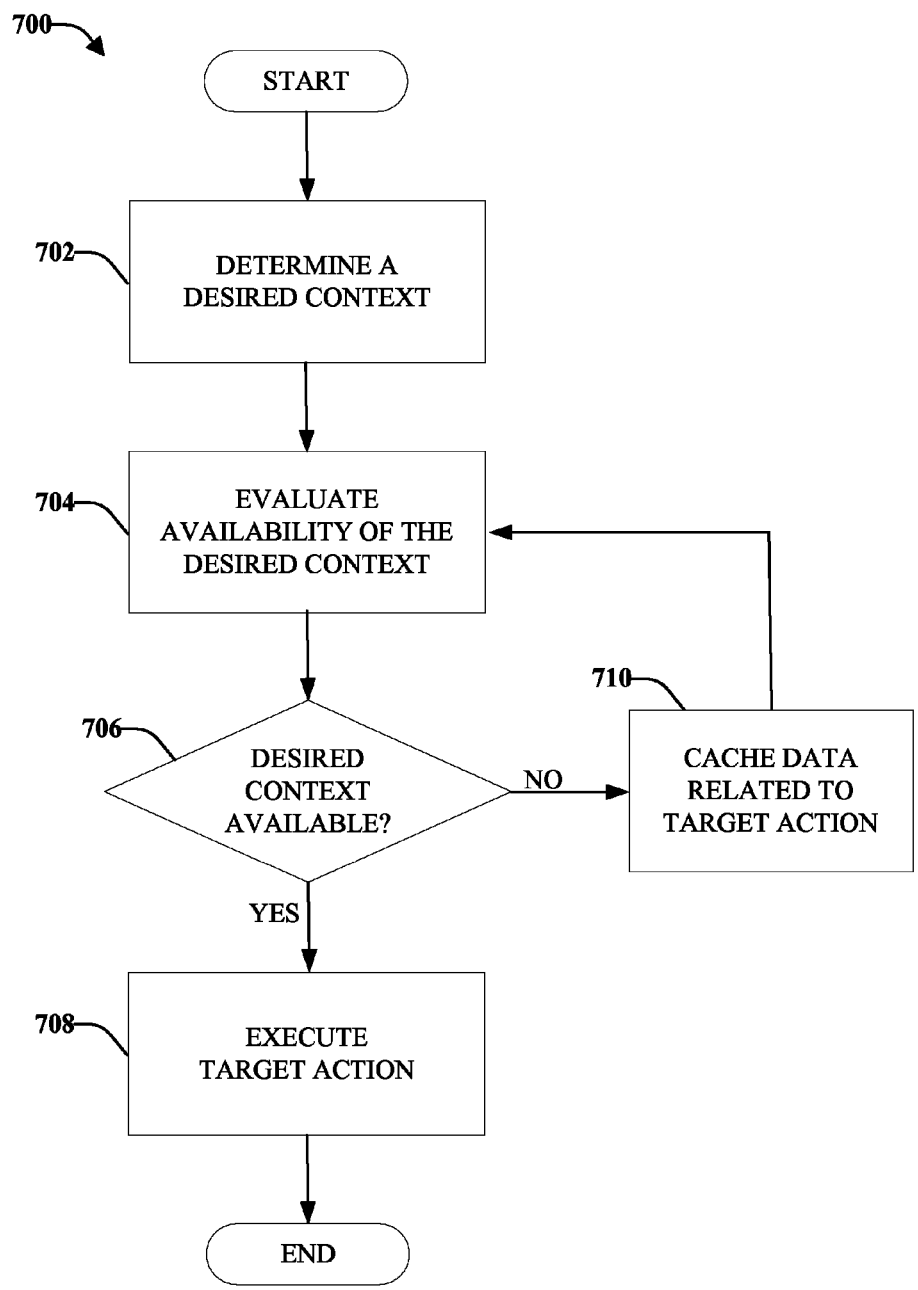
FIG. 7 illustrates a method for delaying execution of tasks until a desired context for the task is available according to an aspect.

FIG. 7 illustrates a method 700 for delaying execution of tasks until a desired context for the task is available according to an aspect. The desired context can be energy, availability of a wireless link, availability of another peer node, availability of a processing performance constraint, a wireless link performance measure, an end-to-end quality of service measure, and so forth. If the desired context is not available, the target action is delayed (or suspended) until the desired context is available. If the desired context is available, the target action is automatically executed.

Method 700 starts, at 702, when a desired context is determined. The context can be an energy state or level, a processing performance level, availability of a wireless link, connectivity parameters, a performance measure on a wireless link, availability of a remote server, availability of a peer device, user activity (or inactivity) on a communication apparatus, and so forth. The desired context can be determined based on parameters associated with the task/information exchange to be executed, wherein if the parameters are not satisfied, the task/information exchange is not enabled. In accordance with some aspects, the desired context can be defined by the communication apparatus, such as parameters that should be available in order for apparatus to function properly.

At 704, the availability of the desired context is evaluated. The contexts can be monitored periodically or continuously based on system parameters. In accordance with some aspects, the contexts can be monitored before, during, or after execution of a target action.

The desired context includes a wireless connection with a remote node (e.g., remote server, peer device, and so forth) and whether there is a connection with a power supply. According to some aspects, the desired context can be an energy level that comprises a connection to a power source. The processing performance level can include a processing performance constraint. In accordance with an aspect, the processing performance constraint can be equal to or less than an available performance measure. The available performance measure can be selectively modified based on performance requirements for associated tasks, according to an aspect. The performance measure on the wireless link can include a wireless link delay constraint, a wireless link bandwidth constraint, a wireless link power constraint, a wireless link interference constraint, an average wireless link throughput constraint, or combinations thereof According to some aspects, the performance measure on the wireless link is an end-to-end quality of service measure. The end-to-end quality of service measure can include an end-to-end delay constraint, an end-to-end throughput constraint, or combinations thereof.

A determination is made, at 706, whether the desired context is available. By way of example and not limitation, a context can be that an energy level might be above a threshold value. A determination can be made, such as by a power management intelligent controller (IC) associated with a device that can detect the battery connectivity to a power source. Additionally or alternatively, the determination can be made as a prediction based on historical information. For example, a user might charge a device at a certain time, such as 9:00 p.m. A predictive engine can schedule a wake-up at, for example 9:30 p.m. to check whether the battery level has gone up or if the device is connected to a battery charger or power supply. When the predictive engine wakes up at that, predicted time, and the power supply is not detected, the predictive engine can wake up every few minutes after that to check for the power supply connection. If the power supply connection is not detected after a certain time (e.g., within a time window), it might be determined that the user has gone to sleep and the target action can be placed in a queue for later deployment.

In accordance with an aspect, prediction can be based on wireless connectivity. For example, a user is driving in their car from home to work and there is a high signal strength (e.g., connectivity). The predictive engine can schedule a wake up each day at this time because the data connectivity is adequate for target actions. However, it should be understood that other criteria can be utilized to determine when to schedule a wakeup to perform one or more target actions. Thus, a predictive engine can have a listing of times that it might utilized to know when to look for connectivity in order to run one or more target actions.

Additionally or alternatively, a predictive schedule can include a variable delay between two consecutive wakeup events. For example, the delay between two consecutive wakeup events can be increased to conserve power. In accordance with some aspects, the delay between two consecutive wakeup events can be varied based on a likelihood of the occurrence of the desired context. For example, if the occurrence of the desired context is expected to occur with a high probability, the consecutive wakeup events can be scheduled to occur more frequently. If there is a low probability that the desired context is expected to occur, the consecutive wakeup events can occur less frequently.

If the desired context is available ("YES"), at 708 the target action is automatically executed. If the desired context is not available ("NO") data associated with the target action are cached or retained in a storage media, at 710. Method 700 can continue, at 704, where parameters associated with the context are evaluated and, if the context is available, at 706, the cached data can be utilized for the executed target action. It is to be understood that this act can be recursive such that the contexts associated with the apparatus can be reviewed any number of times for conformance with various parameters.

Figure 8:
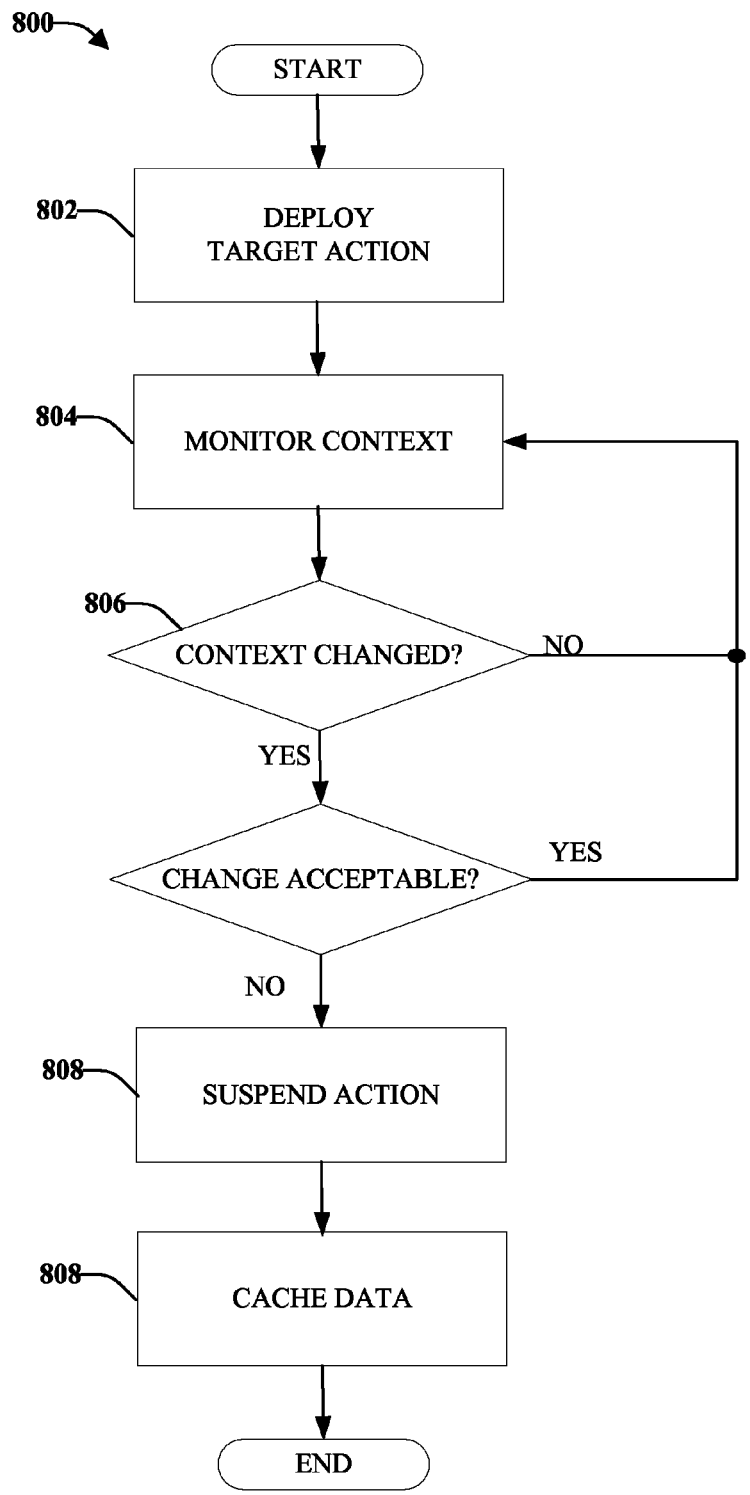
FIG. 8 illustrates a method for selectively suspending a task and/or information exchange in accordance with the disclosed aspects.

FIG. 8 illustrates a method for selectively suspending a task and/or information exchange in accordance with the disclosed aspects. Method 800 starts, at 802, when a target action is deployed. The target action can be deployed similar to method 700 of the above figure. At 804, the context is monitored (e.g., periodically, continuously, and so forth). Monitoring of the context can include evaluating each of the parameters associated with the target action in order to determine if implementation of the target action should continue.

At 806, a determination is made whether a context has changed. If the context has not changed ("NO"), method 800 continues, at 804, with monitoring of the context. If the context has changed ("YES"), method 800 continues, at 808, and a determination is made whether the context change is acceptable. For example, the context change might be that the user has initiated an application, that the device has been removed from a power supply, and so forth. If the context change does not affect the target action, the change is acceptable ("YES") and method 800 continues at 804. If the context change does affect the target action, the change is not acceptable ("NO") and method 800 continues, at 810, where the target action is suspended. Data associated with the target action can be retained, at 812, for later execution of the target action.

Figure 9:
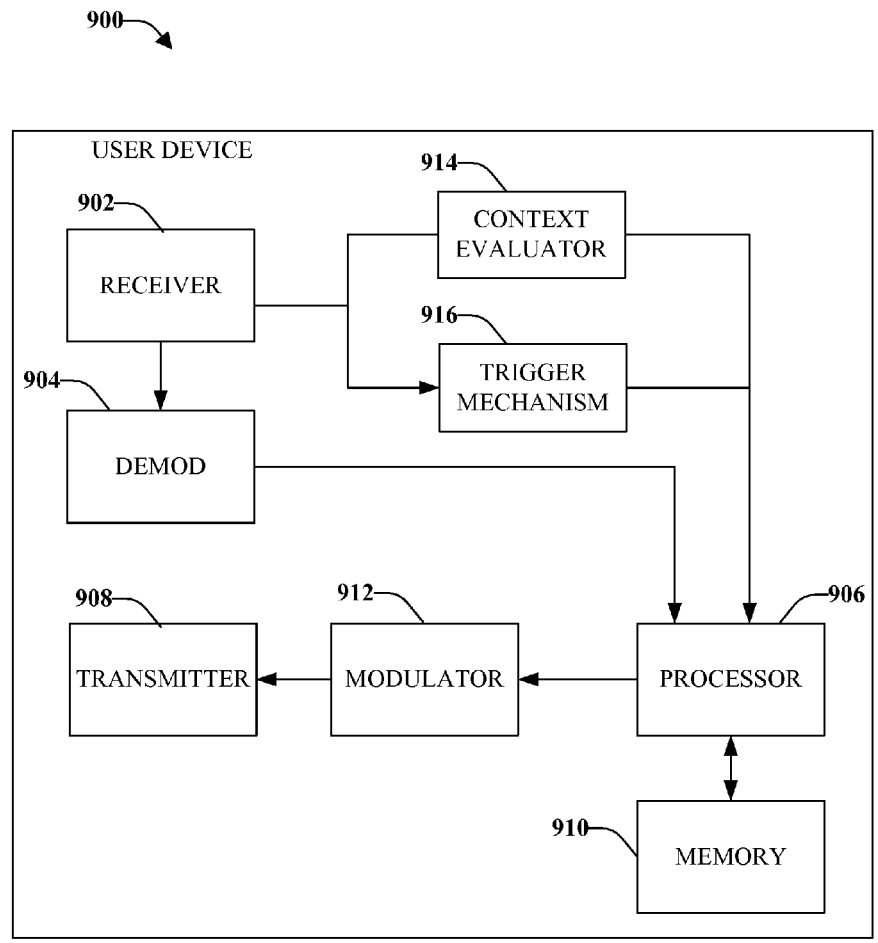
FIG. 9 illustrated is a system that facilitates a wake-up trigger for implementation of target actions in accordance with one or more of the disclosed aspects

With reference now to FIG. 9, illustrated is a system 900 that facilitates a wake-up trigger for implementation of target actions in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, down-converting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 910 operatively coupled to processor 906 and that can store information related to coordinating communications and any other suitable information. Memory 910 can additionally store protocols associated with implementation and/or suspension of target actions. It will be appreciated that the data store (e.g. memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and/or methods is intended to comprise, without being limited to, these and any other suitable types of memory. User device 900 can further comprise a symbol modulator 912 and a transmitter 908 that transmits the modulated signal.

Receiver 902 is further operatively coupled to a context evaluator 914 that gathers information related to a context needed for execution of a target action and determines whether the context is available. The desired context is an energy level, a processing performance level, a connectivity of a wireless link, a performance measure on a wireless link, an availability of an associated device, or combinations thereof. If the context is available, a trigger mechanism 916 is configured to deploy the target action. If the context is not available, data associated with the target action can be retained, such as in memory 910.

Figure 10:
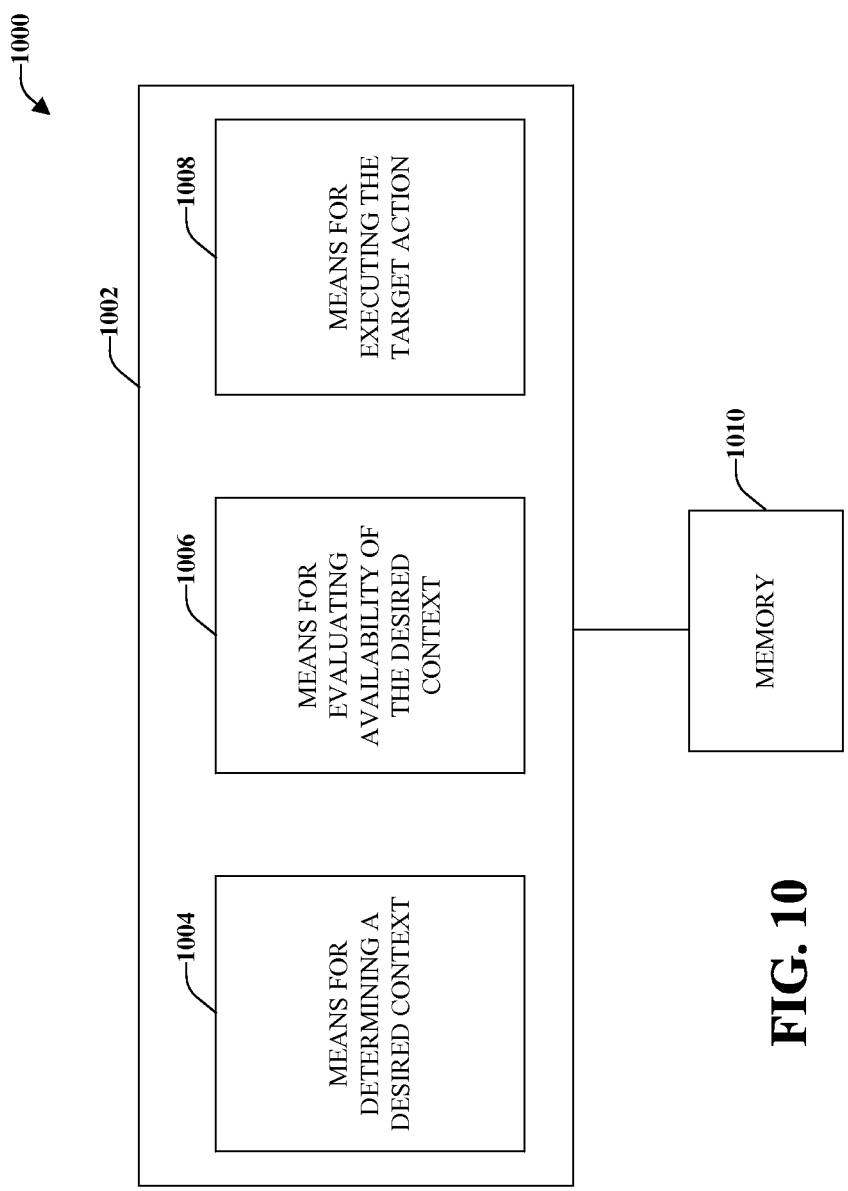
FIG. 10 illustrates an example system that automatically triggers execution of a target action according to the aspects presented herein.

With reference to FIG. 10, illustrated is an example system 1000 that automatically triggers execution of a target action according to the aspects presented herein. For example, system 1000 may reside at least partially within a mobile device. It is to be appreciated that system 1000 is represented as including functional blocks, which can be functional blocks that represent functions implemented by a processor, software, or combination thereof (e.g. firmware).

System 1000 includes a logical grouping 1002 of electrical components that can act separately or in conjunction. Logical grouping 1002 includes means for determining 1004 a desired context as a function of a target action. The desired context can be an energy level, a processing performance level, a connectivity of a wireless link, a performance measure on a wireless link, an availability of an associated device, or combinations thereof.

The associated device can be a remote server and the context can be an availability of connectivity with the remote server. The desired context can be an energy level that comprises a connection to a power source. The processing performance level can include a processing performance constraint. For example, the processing performance constraint is equal to or less than an available performance measure. According to some aspects, the available performance measure can be selectively modified based on performance requirements for associated tasks. The performance measure on the wireless link can include a wireless link delay constraint, a wireless link bandwidth constraint, a wireless link power constraint, a wireless link interference constraint, an average wireless link throughput constraint, or combinations thereof According to some aspects, the performance measure on the wireless link is an end-to-end quality of service measure. The end-to-end quality of service measure can include an end-to-end delay constraint, an end-to-end throughput constraint, or combinations thereof.

Also included in logical grouping 1002 are means for evaluating 1006 availability of the desired context and means for executing 1008 the target action automatically if the desired context is available. In accordance with some aspects, means for evaluating 1006 availability of the desired context utilizes a predictive schedule that is a function of historical information. The predictive schedule can include a variable delay between two consecutive wakeup events. The delay between two consecutive wakeup events is varied based on a likelihood of the occurrence of the desired context. According to an aspect, the delay between two consecutive wakeup events is increased to conserve power.

In accordance with some aspects, logical grouping includes means for retaining data associated with the target action if the context is not available. In accordance with another aspect, logical grouping includes means for monitoring the availability of the desired context, means for suspending execution of the target action if the desired context is no longer available, and means for retaining data associated with the suspended target action.

Additionally or alternatively, logical grouping 1002 includes means for monitoring the availability of the desired context associated with the retained data and means for executing the target action with the retained data when the desired context is available.

Additionally, system 1000 can include a memory 1010 that retains instructions for executing functions associated with electrical components 1004, 1006, and 1008 or other components. While shown as being external to memory 1010, it is to be understood that one or more of electrical components 1004, 1006, and 1008 may exist within memory 1010.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for automatically triggering execution of a target action, comprising:
   determining a desired context as a function of the target action, wherein the desired context comprises a connection to a power supply external to a wireless communications apparatus;
   evaluating availability of the desired context based on a predictive schedule that is a function of historical information, wherein evaluating availability of the desired context comprises evaluating whether the wireless communications apparatus is connected to an external power supply based on the predictive schedule that is a function of historical information about when the wireless communications apparatus previously connected to an external power supply, and wherein the predictive schedule comprises an estimated future time for evaluating the availability and an interval and a time window for re-evaluating the availability when the desired context is not available at the estimated future time; and
   executing the target action automatically if the desired context is available.

2. The method of claim 1, further comprising retaining data associated with the target action if the context is not available.

3. The method of claim 1, further comprising:
   monitoring the availability of the desired context;
   suspending execution of the target action if the desired context is no longer available; and
   retaining data associated with the suspended target action.

4. The method of claim 2, further comprising:
   monitoring the availability of the desired context associated with the retained data; and
   executing the target action with the retained data when the desired context is available.

5. The method of claim 1, wherein the desired context further comprises an availability of connectivity with a remote server.

6. The method of claim 1, wherein the target action is a distributed processing task over a wireless communication link.

7. The method of claim 1, wherein the desired context further comprises a processing performance level, and wherein the processing performance level includes a processing performance constraint.

8. The method of claim 7, wherein the processing performance constraint is less than or equal to an available performance measure, the available performance measure can be selectively modified based on performance requirements for associated tasks.

9. The method of claim 1, wherein the desired context further comprises a performance measure on a wireless link, and wherein the performance measure on the wireless link comprises a wireless link delay constraint, a wireless link bandwidth constraint, a wireless link power constraint, a wireless link interference constraint, an average wireless link throughput constraint, or combinations thereof.

10. The method of claim 1, wherein the desired context further comprises a performance measure on a wireless link, and wherein the performance measure on the wireless link is an end-to-end quality of service measure.

11. The method of claim 10, wherein the end-to-end quality of service measure comprises an end-to-end delay constraint, an end-to-end throughput constraint, or combinations thereof.

12. The method of claim 1, wherein the predictive schedule comprises a variable delay between two consecutive wakeup events.

13. The method of claim 12, wherein the delay between two consecutive wakeup events is increased to conserve power.

14. The method of claim 12, wherein the delay between two consecutive wakeup events is varied based on a likelihood of an occurrence of the desired context.

15. A wireless communications apparatus, comprising:
   a memory that retains instructions related to:
   determining a desired context as a function of a target action, wherein the desired context comprises a connection to a power supply external to the wireless communications apparatus,
   evaluating availability of the desired context based on a predictive schedule that is a function of historical information, wherein evaluating availability of the desired context comprises evaluating whether the wireless communications apparatus is connected to an external power supply based on the predictive schedule that is a function of historical information about when the wireless communications apparatus previously connected to an external power supply, and wherein the predictive schedule comprises an estimated future time for evaluating the availability and an interval and a time window for re-evaluating the availability when the desired context is not available at the estimated future time, and
   executing the target action automatically if the desired context is available; and
   a processor, coupled to the memory, configured to execute the instructions retained in the memory.

16. The wireless communications apparatus of claim 15, wherein the memory further retains instructions related to storing data associated with the target action if the context is not available.

17. The wireless communications apparatus of claim 15, wherein the memory further retains instructions related to monitoring the availability of the desired context, suspending execution of the target action if the desired context is no longer available, and retaining data associated with the suspended target action.

18. The wireless communications apparatus of claim 17, wherein the memory further retains instructions related to monitoring the availability of the desired context associated with the retained data and executing the target action with the retained data when the desired context is available.

19. A wireless communications apparatus that automatically triggers execution of a target action, comprising:
   means for determining a desired context as a function of the target action, wherein the desired context comprises a connection to a power supply external to the wireless communications apparatus;

means for evaluating availability of the desired context based on a predictive schedule that is a function of historical information, wherein the means for evaluating availability of the desired context comprises means for evaluating whether the wireless communications apparatus is connected to an external power supply based on the predictive schedule that is a function of historical information about when the wireless communications apparatus previously connected to an external power supply, and wherein the predictive schedule comprises an estimated future time for evaluating the availability and an interval and a time window for re-evaluating the availability when the desired context is not available at the estimated future time; and means for executing the target action automatically if the desired context is available.

20. The wireless communications apparatus of claim 19, further comprising means for storing data associated with the target action if the context is not available.

21. The wireless communications apparatus of claim 19, further comprising:

means for monitoring the availability of the desired context;

means for suspending execution of the target action if the desired context is no longer available; and means for retaining data associated with the suspended target action.

22. The wireless communications apparatus of claim 21, further comprising:

means for monitoring the availability of the desired context associated with the retained data; and means for executing the target action with the retained data when the desired context is available.

23. A non-transitory computer-readable medium comprising:

a first set of codes for causing a computer to determine a desired context as a function of a target action, wherein the desired context comprises a connection to a power supply external to a wireless communications apparatus;

a second set of codes for causing the computer to evaluate availability of the desired context based on a predictive schedule that is a function of historical information, wherein evaluating availability of the desired context comprises evaluating whether the wireless communications apparatus is connected to an external power supply based on the predictive schedule that is a function of historical information about when the wireless communications apparatus previously connected to an external power supply, and wherein the predictive schedule comprises an estimated future time for evaluating the availability and an interval and a time window for re-evaluating the availability when the desired context is not available at the estimated future time;

a third set of codes for causing the computer to execute the target action automatically if the desired context is available; and a fourth set of codes for causing the computer to retain data associated with the target action if the context is not available.

24. At least one processor configured to automatically trigger execution of tasks, comprising:

a first module for determining a desired context as a function of a target action, wherein the desired context comprises a connection to a power supply external to a wireless communications apparatus;

a second module for evaluating availability of the desired context based on a predictive schedule that is a function of historical information, wherein evaluating availability of the desired context comprises evaluating whether the wireless communications apparatus is connected to an external power supply based on the predictive schedule that is a function of historical information about when the wireless communications apparatus previously connected to an external power supply, and wherein the predictive schedule comprises an estimated future time for evaluating the availability and an interval and a time window for re-evaluating the availability when the desired context is not available at the estimated future time;

a third module for executing the target action automatically if the desired context is available;

a fourth module for suspending execution of the target action if the desired context is no longer available; and a fifth module for retaining data associated with the suspended target action.

* * * * *